(12) United States Patent
Nagahama et al.

(10) Patent No.: US 11,237,354 B2
(45) Date of Patent: Feb. 1, 2022

(54) VARIABLE FOCAL LENGTH LENS APPARATUS

(71) Applicant: MITUTOYO CORPORATION, Kanagawa (JP)

(72) Inventors: Tatsuya Nagahama, Kanagawa (JP); Koji Kubo, Kawasaki (JP); Yuko Shishido, Kanagawa (JP); Masaki Okayasu, Tokyo (JP); Atsushi Usami, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 78 days.

(21) Appl. No.: 16/161,835

(22) Filed: Oct. 16, 2018

(65) Prior Publication Data

US 2019/0121056 A1    Apr. 25, 2019

(30) Foreign Application Priority Data

Oct. 19, 2017   (JP) .............................. JP2017-202784

(51) Int. Cl.
| G02B 7/10 | (2021.01) |
| G02B 3/14 | (2006.01) |
| G02F 1/29 | (2006.01) |
| G02B 13/22 | (2006.01) |
| G02B 9/04 | (2006.01) |
| H04N 5/225 | (2006.01) |

(52) U.S. Cl.
CPC .............. *G02B 7/102* (2013.01); *G02B 3/14* (2013.01); *G02B 9/04* (2013.01); *G02B 13/22* (2013.01); *G02F 1/29* (2013.01); *H04N 5/2254* (2013.01)

(58) Field of Classification Search
CPC . G02B 7/04; G02B 7/08; G02B 7/102; G02B 7/10; G02B 3/14; G02B 13/22; G02B 9/04; G02B 26/004; G03B 3/10; G02F 1/29; H04N 5/2254
USPC ....................................................... 359/823
See application file for complete search history.

(56) References Cited

U.S. PATENT DOCUMENTS

| 2009/0273846 | A1* | 11/2009 | Ori ..................... G02B 15/173 359/684 |
| 2010/0177376 | A1 | 7/2010 | Arnold et al. |
| 2016/0341941 | A1* | 11/2016 | Shimotsu ............... G02B 15/04 |
| 2018/0180773 | A1 | 6/2018 | Usami et al. |
| 2018/0180774 | A1* | 6/2018 | Nagahama ............... G02B 3/14 |
| 2018/0314042 | A1 | 11/2018 | Igasaki et al. |

* cited by examiner

*Primary Examiner* — Mohammed A Hasan
(74) *Attorney, Agent, or Firm* — Greenblum & Bernstein, P.L.C.

(57) ABSTRACT

A variable focal length lens apparatus includes an objective lens and an imaging lens that are aligned on the same optical axis; a front side lens system and a rear side lens system that are disposed in a section between the objective lens and the imaging lens on the optical axis, and change a refractive index in accordance with an input drive signal; and a diaphragm disposed in the section between the front side lens system and the rear side lens system on the optical axis.

2 Claims, 4 Drawing Sheets

VARIABLE FOCAL LENGTH LENS APPARATUS

CROSS-REFERENCE TO RELATED APPLICATIONS

The present application claims priority under 35 U.S.C. § 119 of Japanese Application No. 2017-202784, filed on Oct. 19, 2017, the disclosure of which is expressly incorporated by reference herein in its entirety.

BACKGROUND OF THE INVENTION

1. Field of the Invention

The present invention relates to a variable focal length lens apparatus.

2. Description of Related Art

As a variable focal length lens apparatus, an apparatus has been developed which uses a liquid lens system (hereafter, simply referred to as lens system) in a principle described in U.S. Patent No. 2010-0177376 specification, for example. The lens system is formed by immersing a cylindrical vibrating member formed by a piezoelectric material in transparent liquid. In the lens system, when an AC voltage is applied to an inner circumferential surface and outer circumferential surface of the vibrating member, the vibrating member expands and contracts in a thickness direction and vibrates the liquid inside the vibrating member. By adjusting a frequency of the applied voltage according to the natural frequency of the liquid, a concentric standing wave is formed in the liquid and a concentric region having a different refractive index centered on a center axis line of the vibrating member is formed. Therefore, in the lens system, when light passes along the center axis line of the vibrating member, the light follows a path of that diffuses or converges in accordance with the refractive index for each concentric region.

The variable focal length lens apparatus is configured such that the lens system noted above and the objective lens (such as normal convex lens or a group of lenses) for focusing are aligned on the same optical axis. When parallel light is emitted at the normal objective lens, the light passing through the lens is focused at a focal position apart by a predetermined focal length. On the other hand, when the parallel light is emitted at the lens system aligned coaxially with the objective lens, the light is diffused or converged by the lens system and the light passing the objective lens is focused at a position shifted further or closer from the original focal position (when there was no lens system). Therefore, in the variable focal length lens apparatus, a drive signal input in the lens system (AC voltage of the frequency which generates the standing wave in the liquid inside) is applied and an amplitude of the drive signal is increased/decreased, and thereby the focal position for the variable focal length lens apparatus can be controlled as desired within a fixed range (predetermined variation range that can be increased/decreased by the lens system using the focal length of the objective lens as a standard reference).

As described above, in the variable focal length lens apparatus using the lens system, the focus position can be changed periodically. When constructing an observation system such as a microscope system by the variable focal length lens apparatus of this type, it is preferred that a magnification dose not fluctuate even with the change in the focal length. In other words, an optical system having the lens system is sought to be arranged in a telecentric optical system so as not to change the total magnification for the microscope system even when lens power of the lens system changes.

The telecentric optical system having the lens system is configured, as shown in FIG. 3, with an objective lens 91, an imaging lens 92, and a lens system 93 aligned on an optical axis, for example, on the same optical axis A. Specifically, a telecentric section is formed between the objective lens 91 and the imaging lens 92 and the lens system 93 is arranged therebetween. At this point, a rear side focal position of the objective lens 91 (focal length fo) is conjugated with a primary point position pp1 of the lens system 93. In addition, a front side focal position of the imaging lens 92 (focal length ft) is conjugated with a primary point position pp2 of the lens system 93. Then, a diaphragm (in other words, telecentric diaphragm) must be arranged at the rear side focal position of the filed lens. However, arranging the diaphragm at the primary point position pp1 inside the lens system 93 causes a physical diaphragm element to be arranged in the liquid inside the lens system 93, and thereby preventing the resonance of the liquid inside the lens system 93 and a function as the lens system 93 may be damaged.

In response, as shown in FIG. 4, in the telecentric optical system having the objective lens 91, imaging lens 92, and lens system 93, by adding relay lenses 94, 95 (focal length f1, f2) and performing a relay of an exit pupil of the objective lens 91 (rear side focal position), the position where a diaphragm 96 is arranged and the position where the lens system 93 is arranged are separated and the diaphragm 96 can be taken outside of the lens system 93. However, since the relay lenses 94 and 95 are added to the variable focal length lens apparatus, optical axis length for the variable focal length lens apparatus is increased, which makes it difficult to use the variable focal length lens apparatus toward the observation system such as the microscope system.

SUMMARY OF THE INVENTION

The present invention provides a variable focal length lens apparatus which is telecentric and compact.

The variable focal length lens apparatus according to the present invention includes a objective lens and an imaging lens that are aligned on the same optical axis; a front side lens system and a rear side lens system that are disposed in a section between the objective lens and the imaging lens on the optical axis, and change a refractive index in accordance with an input drive signal; and a diaphragm disposed in the section between the front side lens system and the rear side lens system on the optical axis.

In the present invention, light from a work piece (measured object) is guided from the objective lens, the front side lens system, the diaphragm, to the rear side lens system and can form an image on an image detection element or the like via the imaging lens. Then, by periodically changing a refractive index of the front side lens system and the rear side lens system in accordance with the input drive signal, a focal length as the variable focal length lens apparatus can be varied. In the present invention, the objective lens and the imaging lens are aligned at a proper position on the optical axis, and thereby the section (where the front side lens system, diaphragm, and rear side lens system are arranged) between the objective lens and the imaging lens can be configured in telecentric. Accordingly, when the focal length of the front side lens system and the rear side lens system varies periodically, a magnification can be prevented from changing. Further, the lens system is divided into two to the front side and the rear side and the diaphragm is disposed in the section therebetween, and therefore, in the telecentric section from the objective lens to the imaging lens, the lens system and the diaphragm can be arranged together creating a compact optical system without adding a relay lens separately.

In the variable focal length lens apparatus of the present invention, the front side lens system and the rear side lens system share the same standard and each lens system is connected to a drive control device which inputs the same drive signal preferably. In the present invention, since the front side lens system and the rear side lens system share the same standard, by inputting the same drive signal from the drive control device, a resonance state of each lens system can accurately and readily be obtained. At this point, as the front side lens system and the rear side lens system, it is preferable to use two lens systems each having ½ lens power required as the lens system (variable focal length element) of the variable focal length lens apparatus.

The present invention provides a variable focal length lens apparatus which is telecentric and compact.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
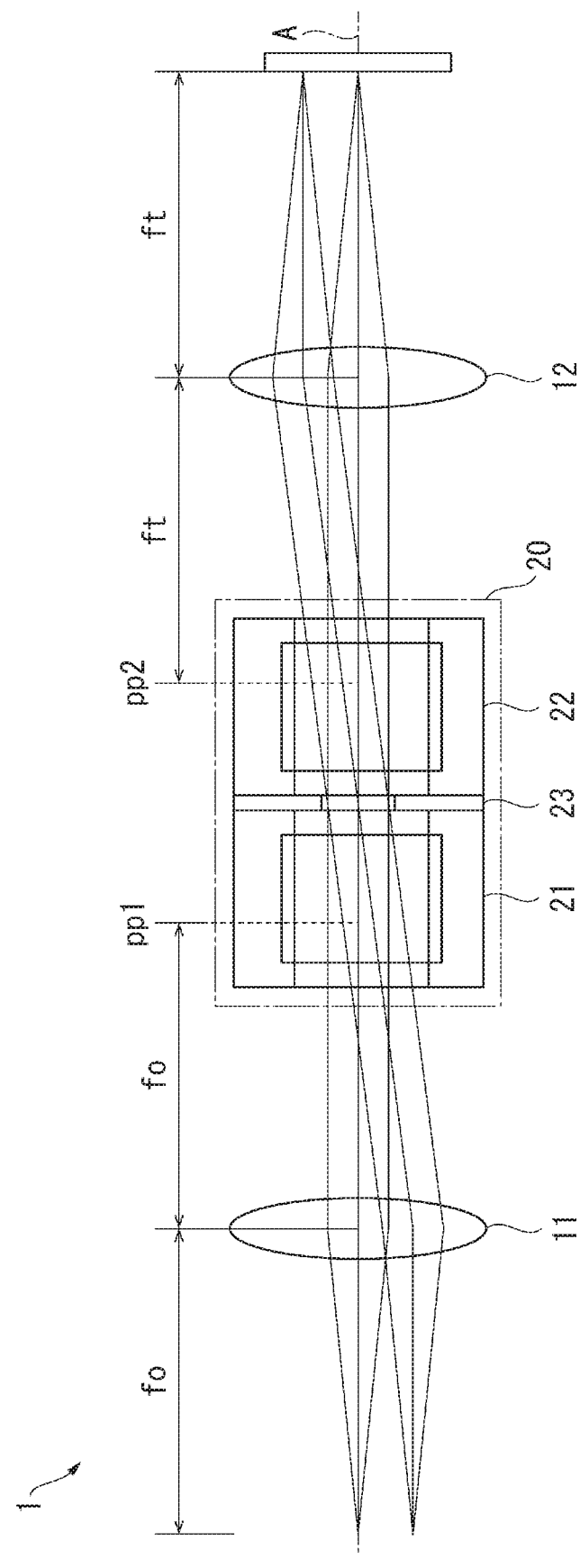
FIG. 1 is a schematic view of a variable focal length lens apparatus according to an embodiment of the present invention.

Hereafter, an embodiment of the present invention is described with reference to the drawings. In FIG. 1, a variable focal length lens apparatus 1 of the present embodiment includes an objective lens 11 and an imaging lens 12 that are aligned on an optical axis A, and a lens system unit 20. A section between the objective lens 11 and imaging lens 12 is telecentric and the lens system unit 20 is arranged therebetween. A rear side focal position of the objective lens 11 (focal length fo) is conjugated with a primary point position pp1 of the lens system unit 20.

Figure 2:
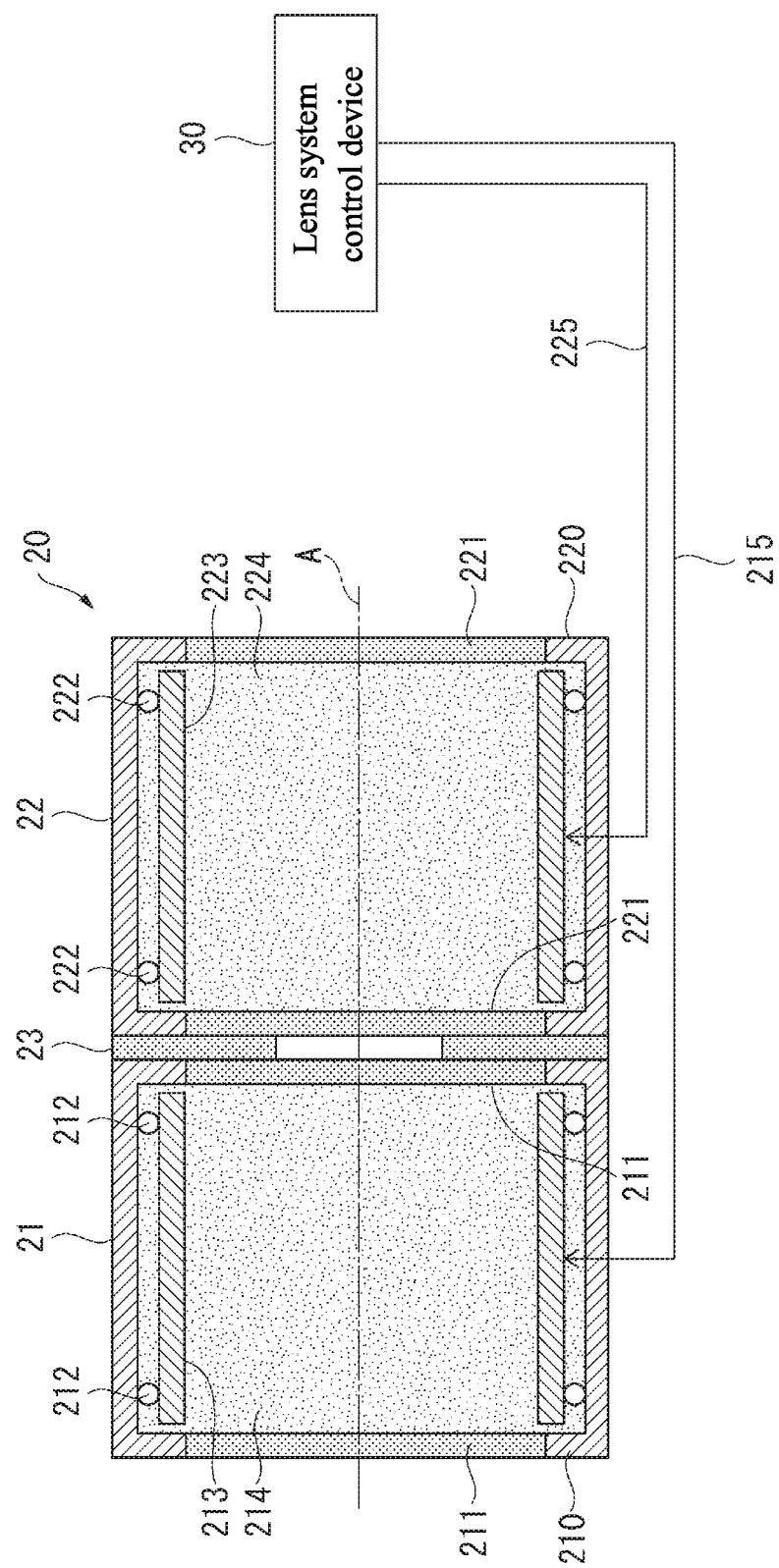
FIG. 2 is a schematic view illustrating a lens system having a diaphragm used in the embodiment.
Figure 3:
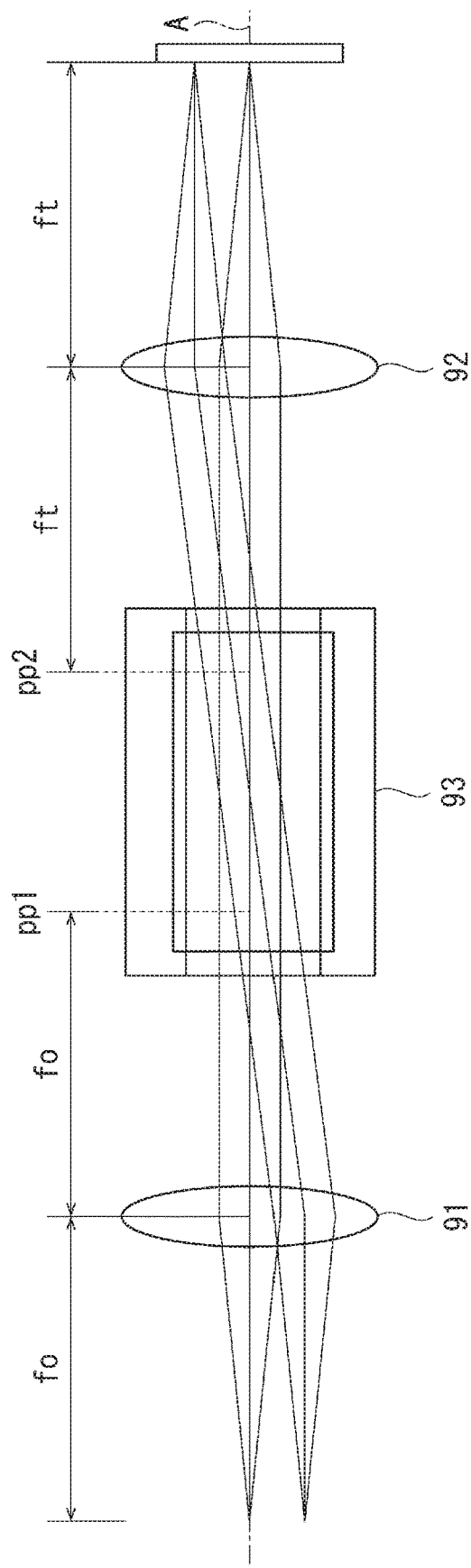
FIG. 3 is a schematic view illustrating a telecentric optical system having a conventional lens system.
Figure 4:
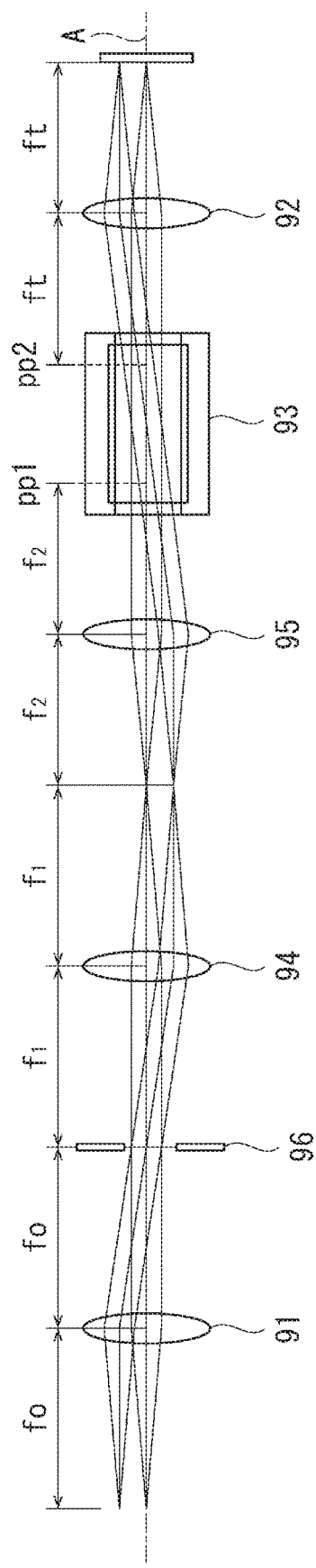
FIG. 4 is a schematic view illustrating a telecentric optical system provided with conventional relay lenses.

In FIG. 2, the lens system unit 20 includes a front side lens system 21 and a rear side lens system 22. A diaphragm 23 is sandwiched between these lens systems 21 and 22. These lens systems 21, 22 and the diaphragm 23 are aligned on the same optical axis (optical axis A when incorporated within the variable focal length lens apparatus 1).

The lens system 21 includes a cylindrical case 210 and a transparent portion 211 is provided in a portion where the optical axis A of the case 210 passes through. Inside the case 210, cylindrical vibrators 213 are coaxially supported via spacers 212. The spacer 212 is an O ring and the like made of synthetic rubber having vibration absorption, and the vibrator 213 is formed by a piezoelectric material which can vibrate by an externally applied voltage. Inside of the case 210 is filled with liquid 214 such as silicone and vibrator 213 is immersed in the liquid 214.

The lens system 22 includes a case 220, a transparent portion 221, a spacer 222, a vibrator 223, and liquid 224 similar to the lens system 21 (case 210, transparent portion 221, spacer 212, vibrator 213, and liquid 214). In other words, the lens systems 21 and 22 share the same standard and are arranged by a pair. The lens power required by the variable focal length lens apparatus 1 can be obtained together with the lens systems 21 and 22.

In the vibrators 213 and 223 of the lens system 21 and 22, signal lines 215 and 225 are respectively connected. The signal lines 215 and 225 are connected individually to a lens system control device 30 (drive control device) provided outside the lens system unit 20. The lens system control device 30 applies, for example, a high frequency drive signal of approximately 70 KHz, for example, to the vibrators 213 and 223 via the signal lines 215 and 225. Characteristics such as voltage and frequency of the drive signal applied to the vibrators 213 and 223 are the same.

In the lens systems 21 and 22, the vibrators 213 and 223 are vibrated by the applied drive signal and generate a concentric standing wave inside the liquid 214 and 224. Accordingly, the focal length of the lens systems 21 and 22 are periodically varied. The lens systems 21 and 22 have the similar configuration and the drive signals are the same, and therefore, the focal length for each lens system is the same.

The diaphragm 23 is a disk-shaped plate material formed with a light transmitting hole in the center and is sandwiched between the cases 210 and 220 of the lens systems 21 and 22. Here, a distance may be provided between the cases 210 and 220. The diaphragm 23 may be fixed to either or each of the cases 210 and 220, or be compressed by bringing the cases 210 and 220 close to each other. Further, the diaphragm 23 and lens systems 21 and 22 may be aligned mutually on the same optical axis A by individually supporting a respective separate support body. In addition, the diaphragm 23 may be arranged at the rear side focal position when the lens 11 and lens system 21 are incorporated.

In the present embodiment noted above, light from a work piece (measured object) is guided from the objective lens 11, the front side lens system 21, the diaphragm 23, to the rear side lens system 22 and can form an image on an image detection element or the like via the imaging lens 12. Then, by periodically changing a refractive index of the front side lens system 21 and the rear side lens system 22 in accordance with the input drive signal from the lens system control device 30, the focal length as the variable focal length lens apparatus can be varied.

In the present embodiment, the objective lens 11 and the imaging lens 12 are disposed at a proper position on the optical axis A, and thereby the section (where the front side lens system 21, diaphragm 23, and rear side lens system 22 are disposed) between the objective lens 11 and the imaging lens 12 can be configured in telecentric. Accordingly, even when the focal length of the front side lens system 21 and the rear side lens system 22 varies periodically, a magnification can be prevented from changing. Further, the lens system is divided into two to the front side lens system 21 and the rear side lens system 22 and the diaphragm 23 is disposed in the section therebetween, and therefore, in the telecentric section from the objective lens 11 to the imaging lens 12, the lens systems 21 and 22 and the diaphragm 23 can be arranged together providing a compact optical system without adding a relay lens separately.

In the present embodiment, since the front side lens system 21 and the rear side lens system 22 share the same standard, by inputting the same drive signal from the lens system control device (lens system controller) 30, a resonance state of each lens system can accurately and readily be obtained. In the present embodiment, two lens systems 21, 22 and the diaphragm 23 are integrally formed to configure the lens system unit 20, and therefore, there is no need to adjust alignment for each element and incorporating the unit to the variable focal length lens apparatus 1 or handling it for maintenance can be readily provided.

The present invention is not limited to the embodiment described above, and includes modifications within a scope capable of achieving the advantages of the present invention. In the embodiment noted above, two lens systems 21, 22 and the diaphragm 23 are integrally formed to configure the lens system unit 20. However, it is not mandatory to unite them and as an optical element for the variable focal length lens apparatus 1, each of the elements may be supported by a structure such as a frame of the variable focal length lens apparatus 1 together with the object lens 11 and imaging lens 12 which are other optical elements.

In the present embodiment, the front side lens system 21 and the rear side lens system 22 shared the same standard and the same drive signal was input individually from the lens system control device 30, however, the drive signal to the lens systems 21 and 22 may differ for the front and rear side and lens systems 21 and 22 may have different standard from each other. However, the front and rear sides share the same standard lens systems 21 and 22 and are driven by the same drive signal, thereby the optical characteristics including the focal length of each element can be matched and handling can be readily performed.

The present invention relates to a variable focal length lens apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A variable focal length lens apparatus comprising:
an objective lens and an imaging lens that are both aligned along a same optical axis;
a front side lens system and a rear side lens system that are disposed along the optical axis in a section between the objective lens and the imaging lens, and that change a refractive index in accordance with an input drive signal; and
a diaphragm disposed in the section between the front side lens system and the rear side lens system along the optical axis, wherein
the front side lens system and the rear side lens system are separated by a predetermined distance that remains constant when the refractive index of the front side lens system and the rear side lens system changes in accordance with the input drive signal.

2. The variable focal length lens apparatus according to claim 1, wherein:
the front side lens system and the rear side lens system share a same standard, and each of the front side lens system and the rear side lens system is connected to a drive controller which inputs a same drive signal.

* * * * *